April 9, 1963   P. H. McMURRAY ET AL   3,084,668
FARROWING PEN CONSTRUCTION
Filed May 7, 1959   2 Sheets-Sheet 2
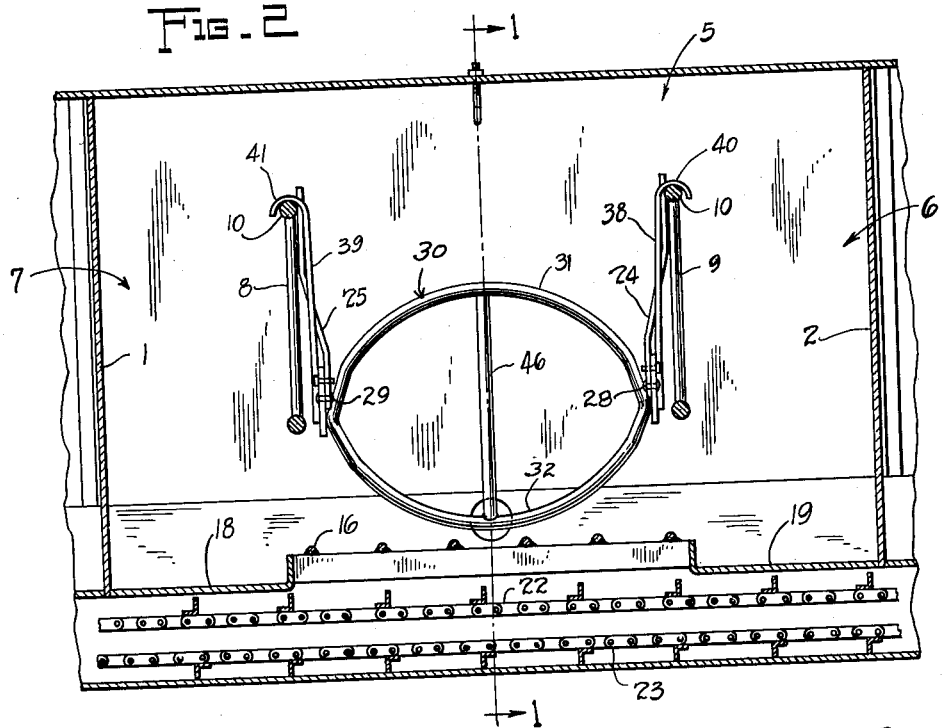
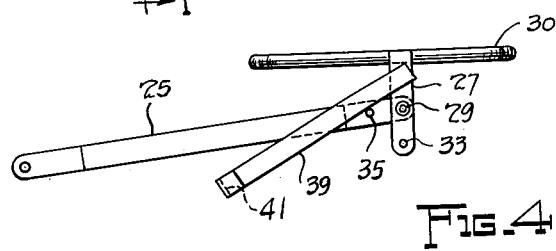
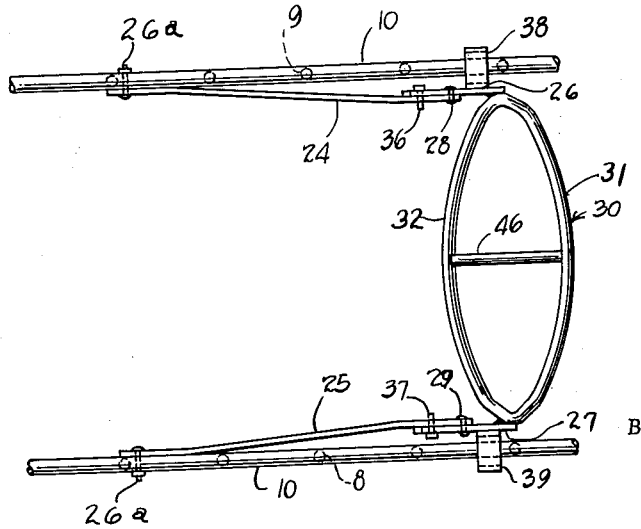
INVENTORS.
P. H. McMURRAY
and
J. M. HAGGARD
BY
Robb & Robb
attorneys ३,०८४,६६८
FARROWING PEN CONSTRUCTION
Paul H. McMurray and John M. Haggard, Delphi, Ind., assignors, by mesne assignments, to A. O. Smith, Harvestore Products, Inc., Kankakee, Ill., a corporation of Delaware
Filed May 7, 1959, Ser. No. 811,631
1 Claim. (Cl. 119—20)

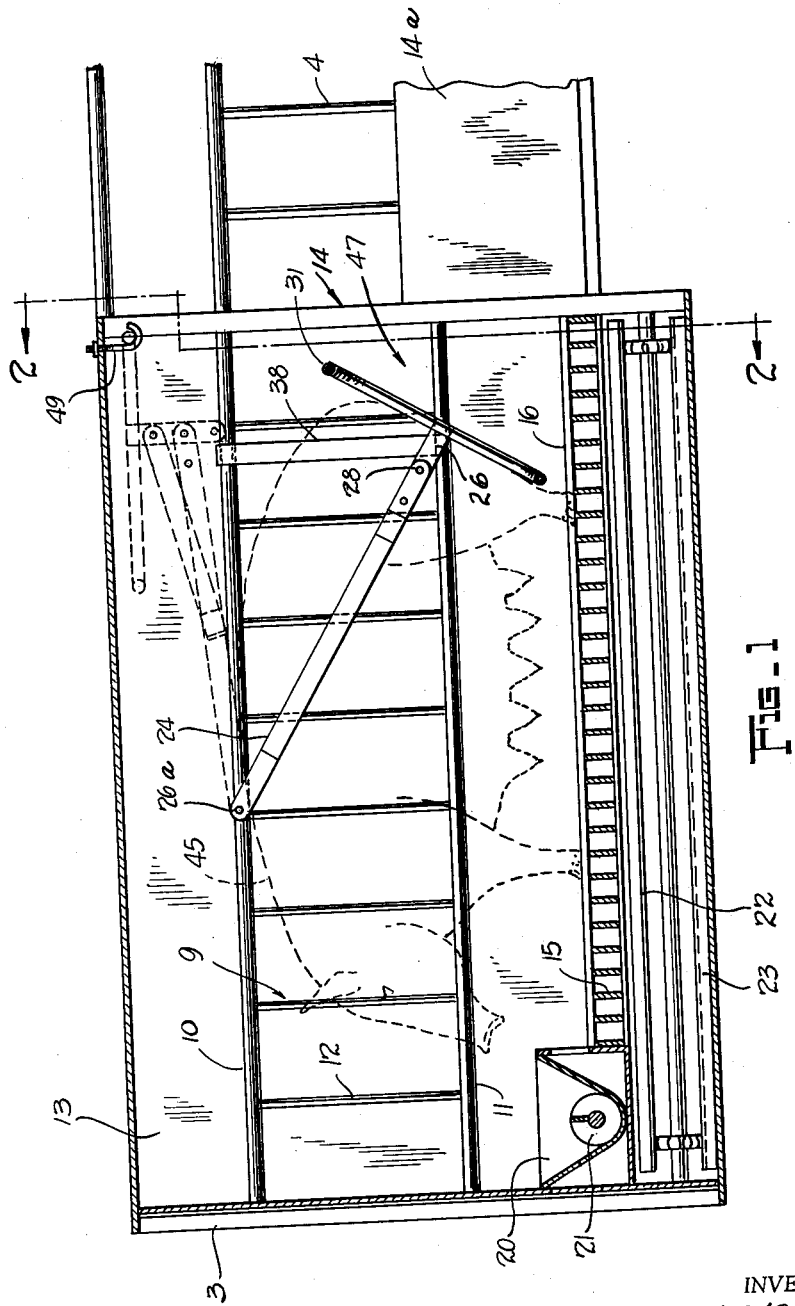

This invention relates to farrowing pen construction, and particularly to certain novel instrumentalities for preventing injury to the sow and her offspring.

More particularly the invention is directed to certain animal positioning means and the construction of the pen with which the same is associated for providing the safety factor as desired as well as other attributes derived therefrom.

A particular phase of the pen construction to which the invention is directed is the formation of the floor and the improvements provided thereby for lifting the sow in position.

While farrowing pens in and of themselves are not new, the concept of this invention involved in providing a vastly superior construction which provides for the reduction in disease, improves the sanitary factors relating to the raising of pigs and enables the safe movement of small pigs with relationship to the sow during the early days and weeks of their lives.

The particular object of the invention is to provide a novel form of animal positioning means which may be incorporated into a farrowing pen to thereby regulate the position to be assumed by the sow both during the normal feeding and eating operations as well as providing for the safe movement of the small pigs to and fro around the sow.

Another object of this invention is to provide a novel floor construction which will assist in the disposal of waste material, and at the same time facilitate the sow in positioning herself both for the nursing and feeding operations.

Another object of the invention is to provide a positioning means in the form of a rump rail construction which is arranged in a farrowing pen so as to assure proper location of the sow in the pen, to make possible the disposal of waste materials, permit the ready movement of the small pigs to and fro in rear of the sow, and enable the birth of the small pigs in the pen to take place without danger of injury thereto as is sometimes the result of birth in farrowing pens.

Other and further objects of the invention will be understood from a consideration of the specification appended hereto and shown in the drawings wherein:

FIGURE 1 is a vertical sectional view, substantially in elevation illustrating the arrangement of the various components, hereof, which view may be said to be taken about on the line 1—1 of FIGURE 2 looking in the direction of the arrows.

FIGURE 2 is a transverse sectional view taken about on the line 2—2 of FIGURE 1 looking in the direction of the arrows.

FIGURE 3 is a fragmentary top view of the rump rail shown in FIGURE 1 in position therein.

FIGURE 4 is a view of the rump rail shown in folded condition as raised out of operative position.

Referring to the drawings, the farrowing pen is generally illustrated in FIGURES 1 and 2 as comprising the spaced sides such as 1 and 2, front end 3 and a rear end such as 4 in the nature of a gate or other closure member which is swingably or hingeably connected at the rear end to the pen.

The pen as a whole includes a central or intermediate section indicated at 5 and the side sections 6 and 7 which are set off from the portion 5 by means of the spaced sides 8 and 9, which sides 8 and 9 may be formed of any suitable material such as by the tubular upper and lower rails 10 and 11 connected by vertically extending tubular parts 12 as indicated in FIGURE 1.

The sides and ends may be constructed of any suitable material such as steel sheet indicated at 13 in FIGURE 1 for the sides and 14 in FIGURE 2 for the rear end, the gate 4 being constructed with a sheet metal lower section such as 14a. Obviously other forms of side members may be availed of the only problem being to restrain the small pigs which will be confined thereby, the sow being always within the central section 5.

The floor of the pen hereof will be comprised of three sections, the central section being built up of a series of transversely extending bars such as 15, which are very closely spaced together, on the order of 7/16 of an inch, preferably, said bars being of substantial rigidity and having extending longitudinally therealong the rods such as indicated at 16 in FIGURE 2. The rods 16 are spaced along the transversely extending bars and suitably fastened to the upper edges of the bars where necessary, thereby providing additional rigidity to the bars and maintaining the spacing thereof.

The side sections 6 and 7 are provided likewise with foraminous floors. In this particular case the same may be expanded metal, not shown in detail but arranged at the locations indicated in FIGURE 2 at 18 and 19, the said floors being at a substantially lower level than the upper plane of the floor in the central or intermediate section 5 previously described.

At the rear end of the pen a suitable feeding trough such as 20 may be provided with suitable screw supply means 21 arranged therein to carry the feed to a position adjacent the animals within the pen.

The lower rails 11 of the sides 8 and 9 are spaced sufficiently above the plane of the floor of the central section 5 so that the small pigs can stand on the floors 18 and 19 and depending upon which side the sow is lying, properly nurse and obtain nourishment thereby.

The provision of the foraminous floor provided by the bars and the expanded metal 15, 18 and 19 respectively, is to enable the waste matter produced by the sow and the pigs to pass therethrough and onto a conveyor having the upper and lower flights 22 and 23 respectively, which will thereupon carry the waste material to one end of the pen, there usually being a series of such pens provided in a farrowing system. This series of pens will of course make practical the provision of such manure removal arrangement as an endless belt construction and obviate many of the problems in handling the same.

The provision of the longitudinal rods 16, secured to the upper edges of the bars 15, is to facilitate the movement of the sow in arising from her reclining position, so that her hooves may impinge against the rods and assist her in moving to an upright position. The rods are of such size as to obviate any obstructions and uncomfortable provision of the floor and yet facilitate the movement as before described.

A novel rump rail unit is provided within the central or intermediate section 5 so as to assist in positioning the sow therewithin and is comprised of the spaced arms such as 24 and 25, pivotally connected at 26a for example to the upper rail 10 of the side 9, the rail 25 being similarly connected to the side 8 as will be readily understood.

At the other ends of the arms 24 and 25, the same are connected to arm elements 26 and 27 respectively at pivot points 28 and 29, such arm elements having at their extremities the hoop-like or ring-like member 30 including the upper ring member 31 and the lower ring member 32 connected at their adjoining ends to the arm elements 26 and 27 in any preferred manner as by welding or the like. The arm elements 27 and 28 additionally provided with the openings such as 33 therein which are adapted to be brought in line with corresponding openings such as 35 formed in the arms such as 25. The arm 24 will of course be similarly equipped as will be the arm element 26 so that a suitable fastener or pin member such as 36 and 37 may be used to maintain the arm elements 26 and 27 in aligned condition with respect to the other arms 24 and 25.

The arm elements 24 and 25 are additionally equipped with offstanding hangers 38 and 39 respectively, which hangers are in turn formed at their upper ends with the hook-like portions 40 and 41 as seen in FIGURE 2.

As indicated in the disclosures of FIGURES 1 and 2, the rump rail now being described, is intended to unfold into the condition shown in FIGURE 1 in full lines from the dotted line position therein so that the hangers 38 and 39 will extend substantially vertically and are hooked over the rails to thereby support the rail in animal engaging position. The lower portion 32 of the ring-like member 30 is located so as to engage with the legs of the sow which is indicated in dotted lines in FIGURE 1 at 45. The upper part or ring member 31 will be availed of if necessary to engage the rump of a large sow and a vertically extending rod 46 connected to the members 31 and 32 will additionally assist in positioning the animal. This arrangement will prevent the sow from backing up so as to occupy the space generally indicated at 47, thereby permitting the small pigs to pass to and fro behind the sow and likewise permit the passage of waste matter downwardly through the floor upon which the sow is standing.

If it be desired to remove the sow from the pen, the rump rail unit may be folded into the dotted line position shown in FIGURE 1, a hook such as 49 being provided with which the lower member 32 of the rail may be engaged to maintain the said rail in the raised or inoperative condition.

It will be understood that the rail unit will fold into the condition such as shown in FIGURE 3 by reason of the extraction of the pins 36 and 37 from the openings provided therefor permitting the folding of the arm elements 26 and 27 at right angles approximately to the arms 24 and 25 respectively.

The provision of the rump rail along the lines indicated and having particular reference to FIGURE 1, will always provide a passage at the rear of the sow, so that even during birth, the small pigs cannot be crushed or otherwise harmed as is often the case during movements of the sow where confined in a pen.

As will normally be the case, the small pigs will usually remain on the floors 18 and 19 and when the sow lies down, the said small pigs will not be crushed or injured during such movement. At the same time the small pigs have access to and fro on both sides of the pen section 5 and thus are permitted to nurse whenever necessary or the sow is in position therefor.

We claim:

A farrowing pen construction comprising, a base, sidewalls, endwalls connected to the sidewalls and defining a primary animal enclosure, walls spaced from the sidewalls and defining a secondary enclosure adapted to contain an animal during its offspring bearing and suckling period and establishing a plurality of offspring receiving areas adjacent the secondary enclosure, gate means associated with one of the walls to permit the introduction of and the withdrawal from the enclosure of the animal, a pair of arms pivotally connected to the walls defining the secondary enclosure, a rump engaging member connected to the arms at the end thereof opposite the pivotal connection, the rump engaging member being of substantially open construction to permit gravitation of animal waste matter from the area of confinement of the animal, strap members connected to the arms at a point remote from the pivotal connection thereof, and means on the strap members for engaging the walls defining the secondary enclosure whereby the arms carrying the rump engaging member may be inclined at an angle to the base to provide the confined animal with a lifting support during confinement while preventing waste from accumulating in the area of confinement.

References Cited in the file of this patent

UNITED STATES PATENTS

| | | |
|---|---|---|
| 830,842 | Makowski | Sept. 11, 1906 |
| 1,186,828 | Pfander | June 13, 1916 |
| 1,436,897 | Novak | Nov. 28, 1922 |
| 1,609,739 | Sherwood | Dec. 7, 1926 |
| 2,044,312 | Laufer | June 16, 1936 |
| 2,602,419 | Johnson | July 8, 1952 |
| 2,688,308 | Hines | Sept. 7, 1954 |
| 2,698,004 | Luther | Dec. 28, 1954 |
| 2,732,826 | Dawson | Jan. 31, 1956 |
| 2,881,734 | Hines | Apr. 14, 1959 |